US008589408B2

(12) United States Patent
Xin et al.

(10) Patent No.: US 8,589,408 B2
(45) Date of Patent: Nov. 19, 2013

(54) ITERATIVE SET EXPANSION USING SAMPLES

(75) Inventors: Dong Xin, Redmond, WA (US); Yeye He, Madison, WA (US); Tao Cheng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 13/163,736

(22) Filed: Jun. 20, 2011

(65) Prior Publication Data

US 2012/0323932 A1 Dec. 20, 2012

(51) Int. Cl.
*G06F 15/16* (2006.01)
*G06F 17/20* (2006.01)

(52) U.S. Cl.
USPC ........................................ 707/748; 707/749

(58) Field of Classification Search
USPC ................................. 707/749, 748
See application file for complete search history.

(56) References Cited

U.S. PATENT DOCUMENTS

| | | | |
|---|---|---|---|
| 7,454,430 B1 | 11/2008 | Komissarchik et al. | |
| 7,577,652 B1 | 8/2009 | Rajan et al. | |
| 7,739,209 B1 | 6/2010 | Rajaraman | |
| 2004/0093328 A1* | 5/2004 | Damle | 707/3 |
| 2006/0195463 A1* | 8/2006 | Bogner et al. | 707/101 |
| 2007/0038937 A1* | 2/2007 | Asakawa et al. | 715/730 |
| 2007/0124291 A1 | 5/2007 | Hassan et al. | |
| 2007/0203908 A1 | 8/2007 | Wang et al. | |
| 2007/0233808 A1 | 10/2007 | Egnor et al. | |
| 2008/0052263 A1* | 2/2008 | Andersen et al. | 707/1 |
| 2008/0082481 A1 | 4/2008 | Joshi et al. | |
| 2008/0270549 A1 | 10/2008 | Chellapilla et al. | |
| 2008/0301121 A1* | 12/2008 | Suzuki et al. | 707/5 |
| 2010/0185691 A1* | 7/2010 | Irmak et al. | 707/803 |

OTHER PUBLICATIONS

Yih, et al., "Improving similarity measures for short segments of text", Retrieved at <<http://citeseerx.ist.psu.edu/viewdoc/download?doi=10.1.1.112.2457&rep=rep1&type=pdf>>, Proceedings of the 22nd national conference on Artificial intelligence, vol. 2, 2007, pp. 6.

Vickrey, et al., "An Active Learning Approach to Finding Related Terms", Retrieved at <<http://www.aclweb.org/anthology/P/P10/P10-2068.pdf>>, ACL Conference Short Papers, Jul. 11-16, 2010, pp. 371-376.

"Google sets", Retrieved at <<http://labs.google.com/sets>>, Retrieved Date: Dec. 17, 2010, p. 1.

(Continued)

*Primary Examiner* — Alex Gofman
(74) *Attorney, Agent, or Firm* — Rau Patents, LLC

(57) ABSTRACT

A set expansion system is described herein that uses general-purpose web data to expand a set of seed entities. The system includes a simple yet effective quality metric to measure the expanded set, and includes two iterative thresholding processes to rank candidate entities. The system models web data sources and integrates relevance and coherence measurements to evaluate potential set candidates using an iterative process. The system uses general-purpose web data that is not specific to the given seeds. The system defines quality of the result set as the sum of two component scores: the relevance of a set of entities that measures their similarity with the given seeds, and the coherence of the set of entities produced which is how closely the entities in the set are related to each other. Based on this quality measure, the system develops a class of iterative set expansion processes.

18 Claims, 6 Drawing Sheets

(56) References Cited

OTHER PUBLICATIONS

"List of united nations member states", Retrieved at <<http://en.wikipedia.org/wiki/List_of_United_Nations_member_states>>, Retrieved Date: Dec. 17, 2010, pp. 19.

"Web colors", Retrieved at <<http://en.wikipedia.org/wiki/Web_colors>>, Retrieved Date: Dec. 17, 2010, pp. 6.

Agichtein, et al., "Snowball: extracting relations from large plain-text collections", Retrieved at <<http://citeseerx.ist.psu.edu/viewdoc/download?doi=10.1.1.33.1827&rep=rep1&type=pdf>>, In Proceedings of the 5th ACM International Conference on Digital Libraries, pp. 85-94.

Baluja, et al., "Video suggestion and discovery for youtube: Taking random walks through the view graph", Retrieved at <<http://www.esprockets.com/papers/adsorption-yt.pdf>>, Proceeding of the 17th international conference on World Wide Web, Apr. 21-25, 2008, pp. 10.

Etzioni, et al., "Web-scale information extraction in KnowItAll", Retrieved at <<http://citeseerx.ist.psu.edu/viewdoc/download?doi=10.1.1.1.1636&rep=rep1&type=pdf>>, Proceedings of the 13th international conference on World Wide Web, May 17-22, 2004, pp. 11.

Etzioni, et al., "Unsupervised named-entity extraction from the web: An experimental study", Retrieved at <<http://www.cs.washington.edu/homes/etzioni/papers/knowitall-aij.pdf>>, Artificial Intelligence, Feb. 28, 2005, vol. 165 No. 1, pp. 1-42.

Ghahramani, et al., "Bayesian sets", Retrieved at <<http://www.gatsby.ucl.ac.uk/~heller/bsets.pdf>>, Advances in Neural Information Processing Systems, 2005, pp. 8.

Karp, Richard M., "Reducibility among combinatorial problems", Retrieved at <<http://www.cs.berkeley.edu/~luca/cs172/karp.pdf>>, In Complexity of Computer Computations, 1972, pp. 19.

Otsu, Nobuyuki, "A threshold selection method from gray-level histograms", Retrieved at <<http://liama.ia.ac.cn/wiki_media/projects:pal:otsu1979.pdf?id=projects%3Apal%3Areadinggroup&cache=cache>>, IEEE Transactions on Systems, Man and Cybernetics, Jan. 1979, vol. 9 No. 1, pp. 62-66.

Ridler, et al., "Picture thresholding using an iterative selection method", Retrieved at <<http://ieeexplore.ieee.org/stamp/stamp.jsp?tp=&arnumber=4310039>>, EEE Transactions on Systems, Man and Cybernetics, vol. 8 No. 8, Aug. 1978, pp. 630-632.

Settles, Burr, "Biomedical named entity recognition using conditional random fields and rich feature sets", Retrieved at <<http://www.cs.cmu.edu/~bsettles/pub/settles.nlpba04.pdf>>, Proceedings of the International Joint Workshop on Natural Language Processing in Biomedicine and its Applications (NLPBA), 2004, pp. 4.

Talukdar, et al., "A context pattern induction method for named entity extraction", Retrieved at <<http://www.aclweb.org/anthology/W/W06/W06-2919.pdf>>, Proceedings of the 10th Conference on Computational Natural Language Learning, Jun. 2006, pp. 141-148.

Talukdar, et al., "Weakly-supervised acquisition of labeled class instances using graph random walks", Retrieved at <<http://www.aclweb.org/anthology-new/D/D08/D08-1061.pdf>>, Proceedings of the Conference on Empirical Methods in Natural Language Processing, Oct. 2008, pp. 582-590.

"Seal", Retrieved at <<http://rcwang.com/seal>>, Retrieved Date: Dec. 17, 2010, p. 1.

Wang, et al., "Language-independent set expansion of named entities using the web", Retrieved at <<http://citeseerx.ist.psu.edu/viewdoc/download?doi=10.1.1.68.6493&rep=rep1&type=pdf>>, Proceedings of the Seventh IEEE International Conference on Data Mining, Oct. 28-31, 2007, pp. 342-350.

Wang, et al., "Iterative set expansion of named entity using the web", Retrieved at <<http://citeseerx.ist.psu.edu/viewdoc/download?doi=10.1.1.142.342&rep=rep1&type=pdf>>, Proceedings of the Eighth IEEE International Conference on Data Mining, 2008, pp. 6.

Wang, et al., "Character-level analysis of semi-structured documents for set expansion", Retrieved at <<http://www.aclweb.org/anthology-new/D/D09/D09-1156.pdf>>, Proceedings of the Conference on Empirical Methods in Natural Language Processing, vol. 3, Aug. 6-7, 2009, pp. 1503-1512.

Wang, et al., "Semi-supervised learning of semantic classes for query understanding", Retrieved at <<http://citeseerx.ist.psu.edu/viewdoc/download?doi=10.1.1.159.6201&rep=rep1&type=pdf>>, Proceedings of the 18th ACM Conference on Information and Knowledge Management, Nov. 2-6, 2009, pp. 10.

* cited by examiner

ITERATIVE SET EXPANSION USING SAMPLES

BACKGROUND

Set expansion refers to the practical problem of expanding a small set of "seed" entities, into a more complete set by discovering other entities that also belong to the same "concept set". Here a "concept set" can be any collection of entities that conceptually form a set that people have in mind, and "seeds" are the instances of entities in the set. As an example, a person wanting to discover all camera brand names may give a small number of well-known brand names like "Canon" and "Nikon" as seeds; the set expansion techniques would leverage the given data sources to discover other camera brands, such as "Leica", "Pentax" and "Olympus" that are also camera brands.

Set expansion systems are of practical importance and can be used in various applications. For instance, web search engines may use the set expansion tools to create a comprehensive entity repository (for, say, brand names of each product category), in order to deliver better results to entity-oriented queries. As another example, the task of named entity recognition can also leverage the results generated by set expansion tools.

Many efforts have been made over the years to develop high-quality set expansion systems. The most relevant efforts include Google Sets, which employs proprietary algorithms to do set expansions. However, due to its proprietary nature, algorithms and data sources behind Google Sets are not publicly available for future research endeavors. Another prominent line of work is the Set Expander for Any Language (SEAL) system, which adopts a two-phase strategy that first builds customized text wrappers based on the input seeds in order to extract candidate entities from web pages in a precise manner. The SEAL system then uses a graph-based random walk to rank candidates entities based on their closeness to the seeds on the graph. While this customized data extraction/ranking process can produce results with high quality, the necessary online data extraction can be costly and time-consuming.

There is a substantial amount of data on the web, but present set expansion techniques work poorly with noisy web data. Two readily available forms of general web data sources are Hypertext Markup Language (HTML) lists extracted from web pages by web crawls (henceforth referred to as web lists) and web search query logs (query logs). Such general-purpose web data can be highly useful for set expansion tasks: they are very diverse in nature, with rich information that covers most domains of interest. In addition, since these general data are not domain/seed specific, they can be pre-processed and optimized for efficiency purposes.

However, these general web data can be inherently noisy. Random walk or other similarity measures alone may not be sufficient to distinguish true results from the noises, especially when the number of seeds is limited. Random walk based ranking techniques used in previous work perform poorly on general-purpose web lists and query logs and produce results with low precision/recall. Partly because of that, previous approaches use seed-specific and page-specific wrappers to reduce the candidate set to a smaller and much cleaner subset over which the random walk based ranking techniques work reasonably well. However, this additional data extraction process is at the cost of overall architectural complexity and system responsiveness.

SUMMARY

A set expansion system is described herein that uses general-purpose web data to expand a set of seed entities. The system includes a simple yet effective quality metric to measure the expanded set, and includes two iterative thresholding processes to rank candidate entities. The resulting system outperforms existing techniques for set expansion on noisy web data. The system models web data sources and integrates relevance and coherence measurements to evaluate potential set candidates using an iterative process. The system uses general-purpose web data that is not specific to the given seeds. Intuitively, a set of expanded results is "good" if it has two properties: (1) the set of produced entities are similar to the given seeds; (2) the set of produced entities are coherent in the sense that they represent a consistent concept. The system abstracts these intuitions and defines quality of the result set as the sum of two component scores: the relevance of a set of entities that measures their similarity with the given seeds, and the coherence of the set of entities produced which is how closely the entities in the set are related to each other. Based on this quality measure, the system develops a class of iterative set expansion processes referred to herein as Set Expansion by Iterative Similarity Aggregation (SEISA). Thus, the set expansion system provides reliable expansion of any type of set with readily available web data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A set expansion system is described herein that uses general-purpose web data (web lists and query logs) to expand a set of seed entities. The system includes a simple yet effective quality metric to measure the expanded set, and includes two iterative thresholding processes to rank candidate entities. The resulting system outperforms existing techniques for set expansion on noisy web data. The system models web data sources and integrates relevance and coherence measurements to evaluate potential set candidates using an iterative process. The system uses general-purpose web data that is not specific to the given seeds. In particular, while previous random walk based approaches leverage the intuition that candidates close to the given seeds in the graph structure are more likely to belong to the same concept set as the seeds, the set expansion system herein takes an alternative tack and proposes to measure the quality of an expanded set of entities relative to the given set of seeds in a more straightforward and comprehensible way.

Intuitively, a set of expanded results is "good" if it has two properties: (1) the set of produced entities are similar to the given seeds; (2) the set of produced entities are coherent in the sense that they represent a consistent concept. The system abstracts these intuitions and defines quality of the result set as the sum of two component scores: the relevance of a set of entities that measures their similarity with the given seeds, and the coherence of the set of entities produced which is how closely the entities in the set are related to each other. Based on this quality measure, the system develops a class of iterative set expansion processes referred to herein as Set Expansion by Iterative Similarity Aggregation (SEISA). Thus, the set expansion system provides reliable expansion of any type of set with readily available web data.

Data Model

As noted above, the set expansion system targets general web data sources, two of which are lists extracted from the HTML web pages and web search query logs. The system models these data sources as bipartite graphs as in FIG. 1, with candidate terms being nodes on one side (henceforth referred to as term-nodes) and their contexts on the other side. Since the system uses textual terms in the web data as candidate entities for the expanded set, the description herein uses the word "term" interchangeably with "entity".

Figure 1:
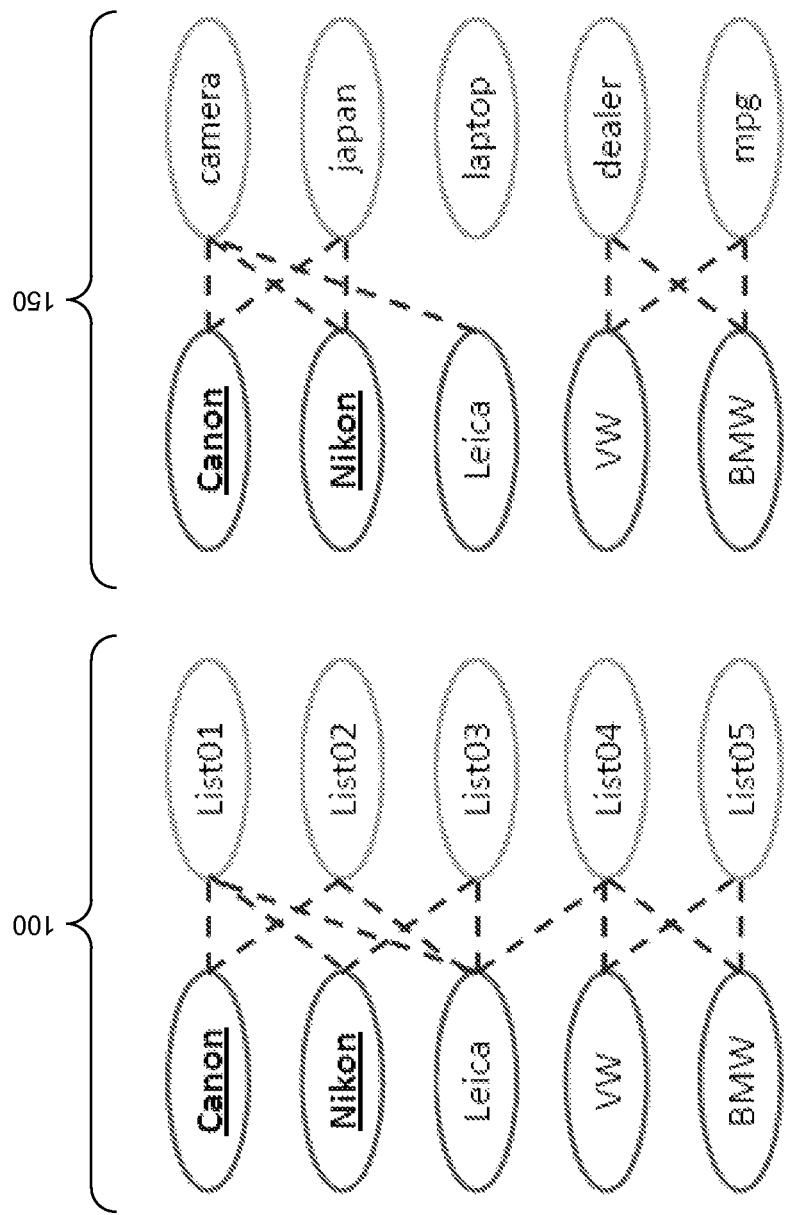
FIG. 1 is a diagram that illustrates two bipartite graphs, one for web list data, and one for query log data, in one embodiment.

FIG. 1 is a diagram that illustrates two bipartite graphs, one for web list data, and one for query log data, in one embodiment. For web list data 100, each web list crawled from the web, ("List01", "List02", etc.), and is modeled as a node on the right-hand-side, while each term that appears in those web lists is modeled as a term-node on the left hand side. In this example, the underlined nodes "Canon" and "Nikon" on the left are the seed terms, while the remaining terms, including "Leica", "VW", and "BMW", are possible candidate terms. There is an edge connecting a term-node with a list-node if that term is a member of the list. For example, the list-node List01 connects to "Canon", "Nikon", and "Leica", indicating that all three terms are members of List01, which is probably a web list on some web page that enumerates a list of camera brands. In some embodiments, the set expansion system assigns a uniform weight of one to each edge in the web list graph. Alternatively or additionally, the system can resort to additional information of the web data to assign different weights to each edge (e.g., using the quality of the page from which the list is extracted).

With query log data 150, for each keyword query, the system breaks up the query into two parts: the term and the context. The context is a prefix or suffix of the query up to two tokens, and the term is the remainder of the query. Each term is again modeled as a graph node on the left, and the context is modeled as a node on the right. There are various ways to model edges in the graph for query log data. In one approach, the system assigns weight to the edge between each pair of nodes using the Mutual Information between the query term and query context, which is defined as follows: let Prob(t) be the probability that term t occurs in the query log, Prob(c) be the probability that context c occurs in the query log, and Prob(t,c) be the probability that the term t and context c co-occur in the query log. The Mutual Information H(t,c) is defined as:

$$H(t, c) = \frac{Prob(t, c)}{Prob(t) * Prob(c)}$$

Furthermore, in some cases the system only keeps the edge between a pair of nodes if the Mutual Information between the term and the context (or the weight on the edge) is positive, and additionally, the co-occurrences of the term and the context is frequent enough to be above a certain threshold. Query log data 150 is an example of the resulting bipartite graph after this processing. In general, this bipartite graph model is straightforward and general enough to be applied and extended to other types of data sources.

Similarity Metric

With this bipartite data model, the overall task of doing set expansion given a set of seeds can be viewed as the problem of finding term-nodes that are similar to the given seed-nodes, using the right hand side nodes as the features. In order to measure similarities between the term-nodes, common similarity metrics, like Jaccard Similarity and Cosine Similarity as defined below, can all be used. Let x and y be two term-nodes on the left hand side of the bipartite graph. Let $L_x$ and $L_y$ be the two sets of right side nodes that connect to nodes x and y, respectively. The Jaccard Similarity of x and y, denoted as $Sim_{Jac}(x,y)$ is defined as:

$$Sim_{Jac}(x, y) = \frac{|L_x \cap L_y|}{|L_x \cup L_y|}$$

Similarly, Let $V_x$ and $V_y$ be the weight vectors that indicate the weights of the edges that connect web lists to node x and y, respectively. The Cosine Similarity of x and y, denoted as $Sim_{Cos}(x,y)$, is defined as $$Sim_{Cos}(x, y) = \frac{V_x \cdot V_y}{\|V_x\| \|V_y\|}$$

The following two examples are illustrations of the Jaccard similarity and Cosine similarity. The first example illustrates computation of Jaccard similarity of two term-nodes in the bipartite graph model. In the web list data 100, the term-node "Canon" connects to $L_{Canon}$={List01,List02}; the term node "Leica" connects to $L_{Leica}$={List01,List02,List03,List04}. By definition, the Jaccard Similarity between "Leica" and the seed node "Canon" is 2/4=0.5. Similarly, the similarity between "Leica" and the other seed node "Nikon" is also 2/4=0.5. On the other hand, the Jaccard similarities between "VW" and both of the seed nodes "Canon" and "Nikon" are 0/6=0. Therefore, using the Jaccard Similarity definition the term "Leica" is more similar to both seeds than the term "VW".

The second example illustrates the computation of Cosine Similarity. In the web list data 100, the term node "Canon" connects to $L_{Canon}$={List01,List02}; its edge weight vector $V_{Canon}$ is thus (1,1,0,0,0). Similarly, the edge weight vector for "Leica" is $V_{Leica}$=(1,1,1,1,0). Thus, the Cosine Similarity between "Leica" and the seed node "Canon" is $$\frac{2}{2.83} = 0.71.$$

Similarly, the similarity between "Leica" and the other seed node "Nikon" is also $$\frac{2}{2.83} = 0.71.$$

The Cosine similarities between "VW" and both of the seed nodes are zero due to the lack of overlap in the right side list nodes. Thus, by both measures the term "Leica" is more similar to the seeds than the term "VW", as one would expect.

Although this discussion only presents two commonly used similarity metrics, the Jaccard Similarity and the Cosine Similarity, those of ordinary skill in the art will recognize that other measures of similarity can be used with the system. Furthermore, in experimental evaluations, the performance of set expansion using both similarity metrics is reasonably good, underlining the generality of the framework.

Quality Measurement

While the previous work uses techniques like random walk to rank individual terms based on their graph structure similarity to the given seeds, the set expansion system views the expanded set of entities as a whole and proposes a simple and intuitive metric to measure the quality of the expanded set, as will be detailed in this section.

The first observation is that, the more similar the expanded entities are to the given seed entities, the better quality the expanded set. This is intuitive because after all the task of set expansion is to find entities that are in the same "concept set" as the seeds, which by definition should be somewhat similar to the seeds. This observation can be formalized with the following definition of relevance to capture the similarity between the expanded set and the seed set. Let U be the universe of entities, $R \subset U$ be the expanded set, and $S \subset U$ be the seed set. Let Sim: $\overline{U \times U} \rightarrow [0,1]$ be the function that measures the similarity of any two entities. The relevance of R with respect to S is defined as:

$$S_{rel(R,S)} = \frac{1}{|R|*|S|} * \sum_{r \in R} \sum_{s \in S} Sim(s, r)$$

Figure 2:
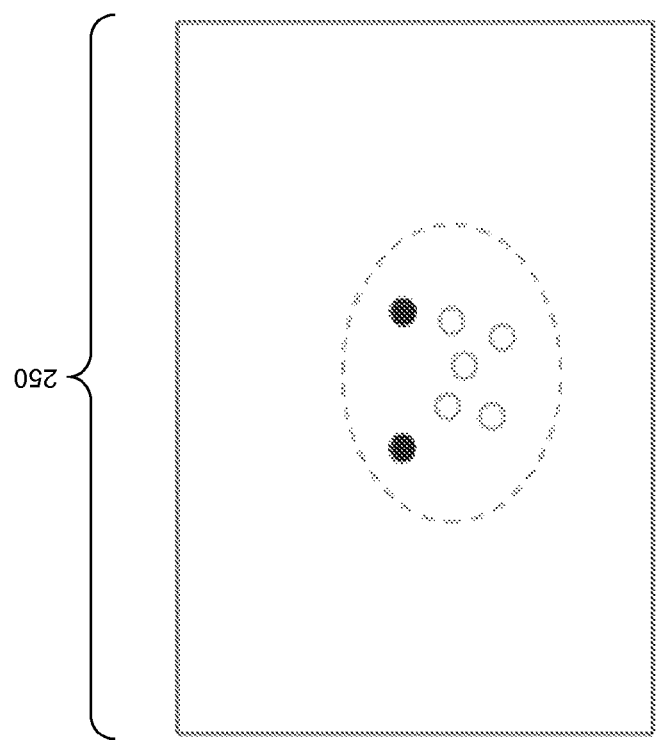
FIG. 2 graphically demonstrates the quality of the expanded set, in one embodiment.
Figure 2:
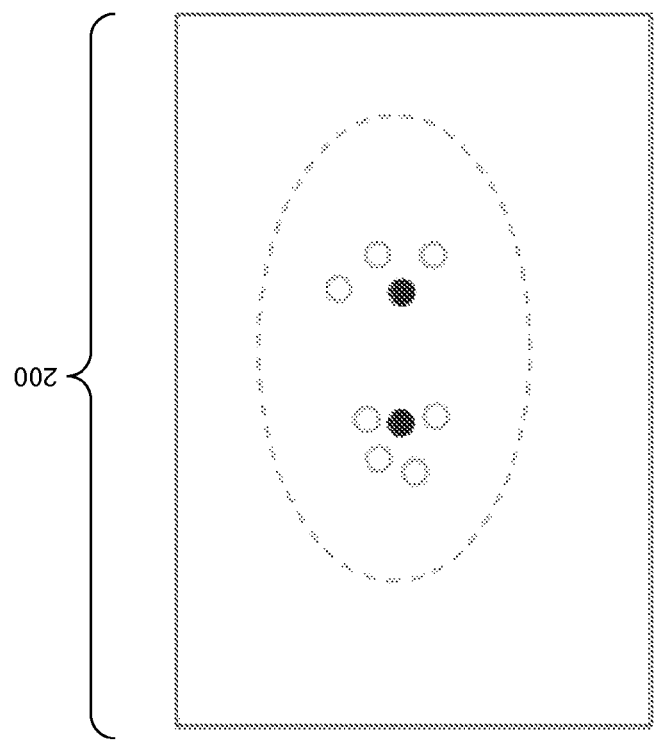

FIG. 2 graphically demonstrates the quality of the expanded set, in one embodiment. In both the left graph 200 and right graph 250, the two solid dots in the middle represent the given seed set S, while the circles surrounding these two dots are the derived entities that constitute the expanded set R. The similarity of any two entities is then represented as the distance of these two dots in the graph. In both of these two figures, the expanded set of entities as circled by the dashed oval are very similar (or graphically speaking, close) to the two given seeds. Therefore, in terms of the relevance metric, both of the two sets in FIG. 2 have high relevance to the given seeds.

However, this definition of relevance alone does not fully capture the quality of the expanded set. While the overarching goal of set expansion is to find a consistent "concept set" that are very similar to the given seeds, there could be cases where a set of entities are similar to the seeds but not consistent enough to be a coherent concept set. As an example, in the left graph 200, while the expanded entities as denoted by the circles are close to the given seeds, they are relative dispersed in the space and may not form a consistent "concept set" as required by set expansion. On the other hand, the expanded entities in the right graph 250 are not only equally close to the given seeds as in the left graph 200, they are also much closer to each other to form a consistent "concept set". Thus, the expanded entities in the right graph 250 may be a better candidate for the expanded set than the entities in the left graph 200

To capture the intuition in the right graph 250 that the closer the entities in the expanded set are to each other, the more coherent and thus better the set as a whole is, the system formally defines the notion of coherence as follows. Let U be the universe of entities, $R \subset U$ be the expanded set, and Sim: $\overline{U \times U} \rightarrow [0,1]$ be the function that measures the similarity of any two entities. The coherence of R is defined as:

$$S_{coh}(r) = \frac{2}{|R|*(|R|-1)} * \sum_{i=1}^{|R|} \sum_{j>i}^{|R|} Sim(r_i, r_j)$$

wherein $r_i, r_j \in R$.

Based on the observation that both relevance and coherence contribute to the quality of an expanded set, the system defines the quality of the expanded set as the weighted sum of relevance and coherence as follows. Let U be the universe of entities, let $R \subset U$ be the expanded set, $S \subset U$ be the seed set, and let $0 \leq \alpha \leq 1$ be the constant weight factor. The quality of the expanded set R with respect to the seed set S, Q(R,S), is defined as:

$$Q(R,S) = \alpha * S_{rel}(R,S) + (1-\alpha) * S_{coh}(R)$$

Here, α is a constant weight that balances the emphasis between relevance and coherence (e.g., 0.5).

Set Expansion

With the definition of quality metric, the problem of set expansion can be formally stated as follows. Given the universe of candidate terms U and some seeds $S \subset U$, and a similarity function Sim: $U \times U \rightarrow [0,1]$ that measures the similarity of any two terms, identify the expanded seed set R, where $R \subset U$ and is of size K, such that the objective function Q(R,S) (defined above) is maximized.

The expanded seed set (ESS), is the core component of the concept set that we want to expand, and includes entities that are known with high confidence to belong to the desired concept set. An ESS is good if its quality score is high. Once a good ESS (denoted as R) is derived, individual terms t can then be ranked based on R and the seed set S using the ranking function g (t, R, S), which is again a straightforward combination of relevance score and coherence score as follows.

$$g(t, R, S) = \frac{\alpha}{|S|} \sum_{i=1}^{|S|} Sim(t, s_i) + \frac{1-\alpha}{|R|} \sum_{i=1}^{|R|} Sim(t, r_i)$$

where $r_i \in R$ and $s_i \in S$.

The problem of finding the optimal R of size K with maximum quality score is NP-hard. The hardness of this problem can be proved by reduction from the maximum clique problem and is not presented herein. Given that it is NP-Hard to find the optimal expanded seed set, the system includes two greedy processes, a static thresholding process and a dynamic thresholding process, that iteratively refine a candidate ESS R to maximize Q(R,S). Both processes are built on top of an automatic score thresholding technique. The following sections outline the two processes.

Static Thresholding Process

On the high level, the static thresholding process fixes the size of ESS R at the beginning, and then iteratively searches for terms in R to maximize Q(R,S); while the dynamic thresholding process refines both the size of R and contents of R at the same time in each iteration.

The static thresholding process starts with a good guess of ESS, then iteratively improves the quality metric by replacing one entity in the ESS of the previous iteration, until the computation of ESS converges and a local maximum of the quality score is reached. The pseudo-code of the process is:

```
Static_Thresholding (seeds,graph)
for each term_i in graph.terms do
    RelScore[i] ← S_rel(term_i,seeds)
end for
sort term_i by RelScore[i] desc
            K ← PickThreshold(RelScore[i])
R_0 ← the top K ranked terms by RelScore[i]
            iter ← 1
while true do
    for each term_i in graph.terms do
        SimScore[i] ← S_rel(term_i,R_iter-1)
        g(term_i) ← α * RelScore[i] + (1 - α) * SimScore[i]
    end for
    sort term_i by g(term_i) desc
    R_iter' ← the top K terms by g(term_i)
    if R_iter' ≠ R_iter-1' then
        let r∈R_iter' be the top ranked term not in R_iter-1
        let q∈R_iter be the last ranked term in R_iter-1
        R_iter ← (R_iter-1 ∪ {r}) - {q}
    else
        R_iter ← R_iter-1
        break
    end if
    iter + +
end while
return R_iter
```

The static thresholding process takes two parameters, the set of seed entities, seeds, and the graph with all candidate terms as left side nodes, graph. The process starts by computing the relevance score of each term with the seeds, $S_{rel}(term_i, seeds)$, in the first for loop. The process then ranks the terms according to their relevance scores, and picks the top K ranked terms as the initial estimate of the ESS, $R_0$, where the threshold value K is determined by a thresholding analysis of the score distribution detailed further herein.

In the subsequent iterations of the while loop, the process iteratively computes the new candidate ESS $R_{iter}$ based on $R_{iter-1}$ of the previous iteration and progressively improves the overall quality score of the ESS until a local maximum is reached. Specifically, in each iteration, iter, the process computes the relevance score of each candidate term $term_i$ with the previous ESS $R_{iter-1}$, $S_{rel}(term_i, R_{iter-1})$, and the corresponding ranking function $g(term_i)$, which is a weighted combination of the relevance score with the seeds, and the relevance score with $R_{iter-1}$. The process then sorts the candidate terms by $g(term_i)$. Let the top ranked K terms be $R_{iter}'$, if $R_{iter}' \neq R_{iter-1}'$, the process replaces the lowest ranked term in $R_{iter-1}$ with the top ranked term $r \in R_{iter}'$ that is not in $R_{iter-1}'$, and then continues the iteration. Otherwise, the process has converged and will stop and return $R_{iter-1}$ as the result of ESS.

It can be proven that after a fixed number of iterations, the computation of $R_{iter}$ will converge and stops changing for subsequent iterations. To outline the intuition of the proof of the convergence, note that in the computation of ESS, the process implicitly maximizes the quality score of ESS. This quality function will monotonically increase in each iteration, until reaching a local maximum, at which point it will converge and stop.

While the process is bound to converge, there is no predetermined upper bound on the number of iterations the process may take. However, in experiments, it is observed that the process converges quickly and typically takes only a small number of iterations (e.g., less than 10). This process is called static thresholding due to the way the estimated size of ESS, K, is determined. In the static thresholding process, once threshold K is determined in the first iteration, it will stay the same in subsequent iterations. In the following section, a variant is presented in which K changes from iteration to iteration.

Dynamic Thresholding Process

While the static thresholding process described previously will converge, its use of the static threshold (the parameter K) as computed in the first iteration may not accurately reflect the actual size of the ESS. It can be the case that in subsequent iterations with iterative score computation that based on the new score distribution, the new threshold value—which is interpreted as the size of the ESS—is significantly different from the initial estimate derived from the score distribution for the first iteration. To overcome this issue, the system provides a dynamic thresholding process that iteratively uses the new threshold value of the current score distribution to adjust the estimated size of ESS. The structure of this process is similar to that above. The process first computes the relevance score between each candidate term $term_i$ and the seeds. The process again invokes the thresholding procedure to find a good threshold value $K_0$, and uses the top ranked $K_0$ terms as the initial ESS, $R_0$. The pseudo-code of the process is:

```
Dynamic_Thresholding (seeds,graph)
for each term_i in graph.terms do
    RelScore[i] ← S_rel(term_i,seeds)
end for
sort term_i by RelScore[i] desc
            K_0 ← PickThreshold(RelScore[i])
R_0 ← the top K_0 ranked terms by RelScore[i]
            iter ← 1
while iter < MAX_ITER do
    for each term_i in graph.terms do
        SimScore[i] ← S_rel(term_i,R_iter-1)
        g(term_i) ← α * RelScore[i] + (1 - α) * SimScore[i]
    end for
    K_iter ← PickThreshold(g(term_i))
    sort term_i by g(term_i) desc
    R_iter' ← the top K_iter terms by g(term_i)
    R_iter ← R_iter'
    iter + +
end while
return R_iter
```

In each subsequent iteration, the process again rank each term, $term_i$, using the ranking function $g(term_i)$. Based on the new score distribution computed using $g(term_i)$, the process invokes the automatic thresholding procedure to determine a new estimate of size of ESS, $K_{iter}$. Instead of using the initial threshold $K_0$ computed in the first iteration as in the static thresholding process, the dynamic thresholding process recomputes the threshold based on the new score distribution. This dynamic thresholding technique adapts to the changes in the score distribution and may be able to reflect the size of the ESS more accurately. In practice, this process slightly outperforms the static thresholding process.

However, since the process dynamically changes the thresholding value, the convergence is no longer guaranteed as in the static thresholding process. Therefore, the system sets a loop-termination condition that is the maximum number of iterations to execute for efficiency considerations. In practice, results and performance are good even with a small number of iterations (e.g., five).

Score Thresholding

This section outlines a solution to the sub-problem of automatically determining a natural threshold that separates two underlying score distributions from one score distribution. This problem arises with a set of scores, each of which represents an estimation of the likelihood of the term being a member of the "concept set" a process is trying to uncover.

Figure 3:
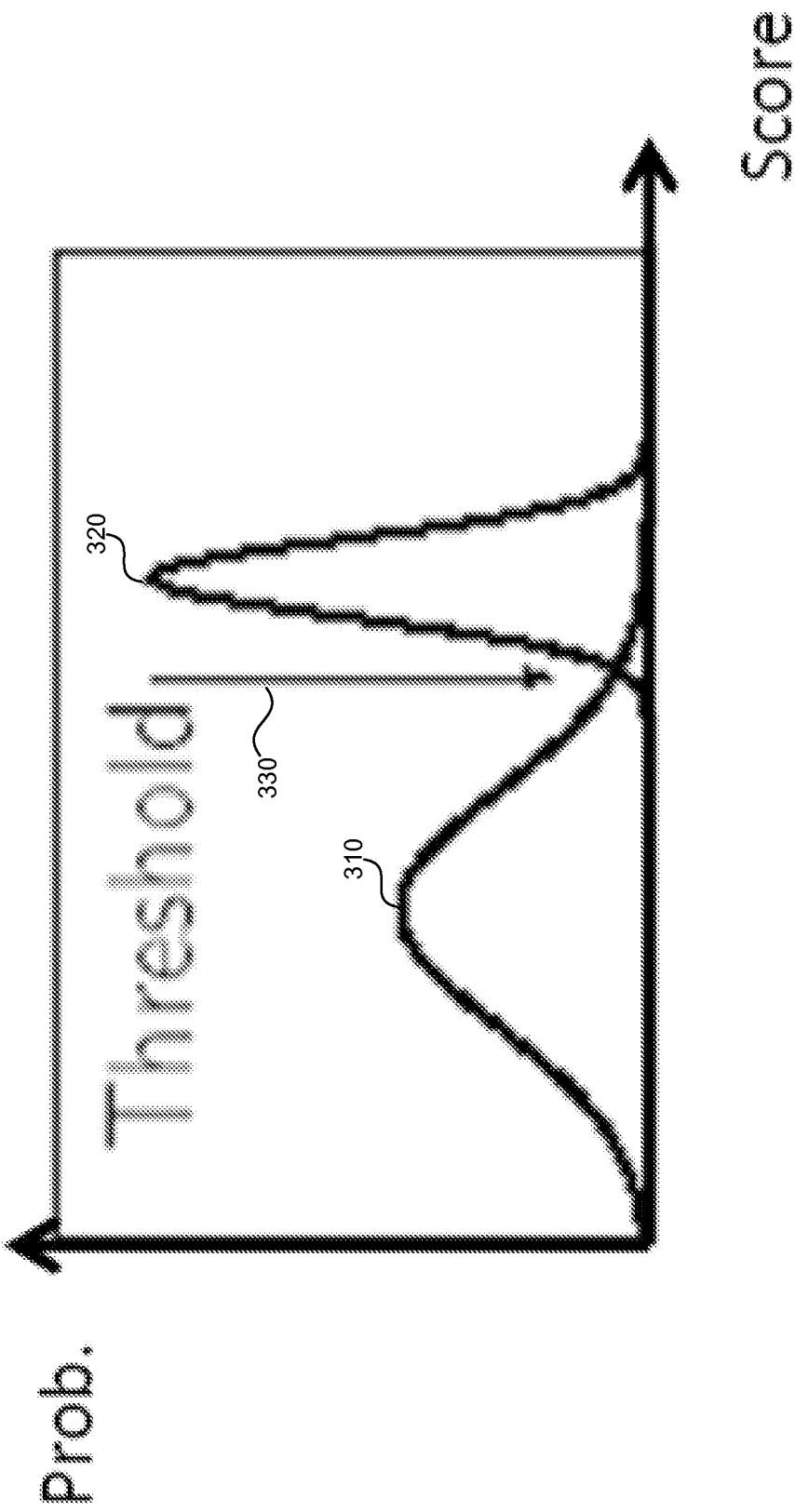
FIG. 3 is a graph that graphically illustrates a possible distribution of nodes in a set, in one embodiment.

FIG. 3 is a graph that graphically illustrates a possible distribution of nodes in a set, in one embodiment. Those terms that really belong to the "concept set" will have higher scores, and follow some kind of score distribution as in the right curve 320; while those that do not belong to the set will have lower scores, but also follow a score distribution as the left curve 310. Thus, the problem becomes the classical score thresholding problem (i.e., identifying the threshold 330), which can be solved with techniques known in the art.

In particular, the same problem arises in image segmentation in computer graphics, where the goal is to separate a foreground image from a background image. Each pixel in the image has a gray scale value that follows one of two distributions: those belong to the foreground and those belong to the background. In computer graphics literature, a number of thresholding algorithms have been proposed and shown to be effective, including the Iterative Threshold Selection and Otsu's Thresholding. The set expansion system uses a thresholding algorithm to find a good threshold point that naturally separates those high scoring terms from those background terms. Formally, Otsu's threshold is defined as follows. Let $\omega_1$, $\omega_2$ be the probabilities of the two classes separated by a threshold t, and $\sigma_1^2$, $\sigma_2^2$ be the variances of these two classes. The weighted sum of the variances of the two classes is $f(t)=\sigma_\omega^2(t)=\omega_1^2(t)+\omega_2(t)\sigma_2^2(t)$. The Otsu's Threshold T is defined as the one that minimizes f (t).

Otsu's technique sees the two sets of scores separated by the threshold as two clusters, based on the observation that the threshold that best separates the two clusters is the point with the least intra-cluster variances. Therefore, Otsu's thresholding uses the sum of the two intra-cluster variances as the objective function, and searches for the point that minimizes the sum of the intra-cluster variances as the threshold. In some experiments, the set expansion system performed better with Otsu's Thresholding than other techniques. Given a sorted list of scores, the Otsu's threshold can be computed linearly.

System Components and Operation

Figure 4:
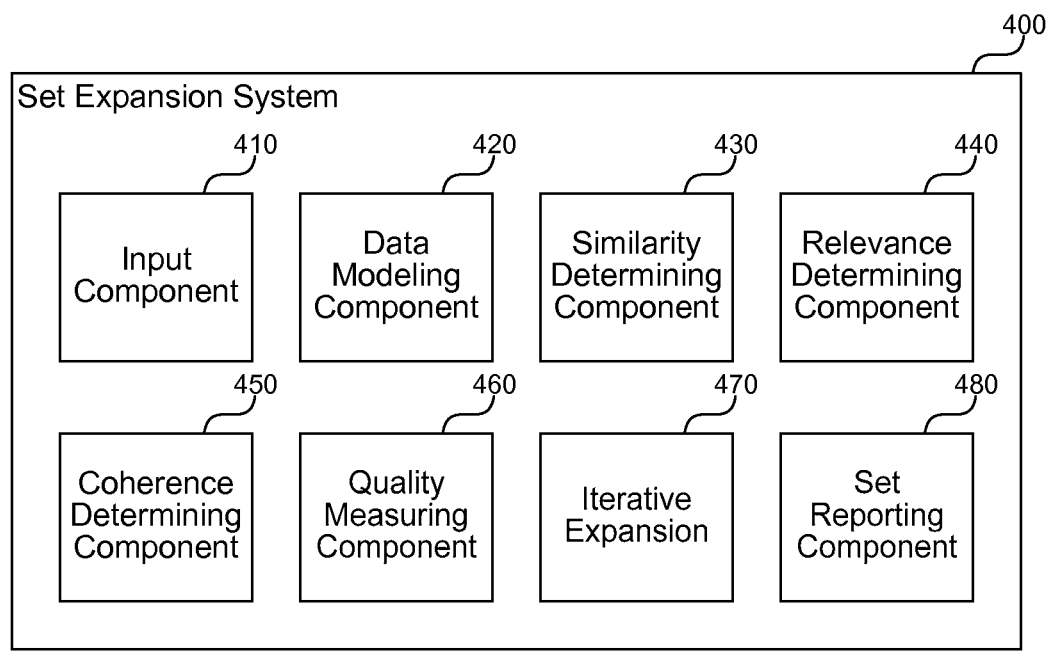
FIG. 4 is a block diagram that illustrates components of the set expansion system, in one embodiment.

FIG. 4 is a block diagram that illustrates components of the set expansion system, in one embodiment. The system 400 includes an input component 410, a data modeling component 420, a similarity determining component 430, a relevance determining component 440, a coherence determining component 450, quality measurement component 460, an iterative expansion component 470, and a set reporting component 480. Each of these components is described in further detail herein.

The input component 410 receives a set of seed terms and a set of potentially related terms with which to expand the set of seed terms. The seed terms may be provided manually by a user or through another automated process that identifies seeds. For example, an e-commerce retailing with a website listing one type of product may provide the product brand names as one type of seed to find other brands of the same product type. The input may come from web lists, query logs, or other sources. The input component 410 may provide an application-programming interface (API) through which other software components can programmatically access the system 400 to perform set expansion. The system 400 can be incorporated into a number of other processes useful to users for a variety of tasks.

The data modeling component 420 models the received terms and seeds as a bipartite graph with candidate terms being nodes on one side and identified context nodes on the other side. In some embodiments, the component 420 assigns weights to the edges between nodes based on a quality of a page from which the terms were extracted or other information. In some embodiments, the input includes web query log data and the component 420 divides each query into a context of a fixed number of tokens (e.g., two) of prefix or suffix and a remaining term. In some embodiments, the component 420 weights the edges for query log data using a mutual information probability. The component 420 may assign a threshold probability below which edges are discarded.

The similarity determining component 430 determines a similarity metric between two candidate nodes in the graph based on the candidate nodes' relationship to the context nodes in the graph. The component 430 may determine a Jaccard Similarity that compares the intersection and union of the sets of nodes to determine the similarity metric. Alternatively or additionally, the system may determine a Cosine Similarity based on weight vectors that indicate the weights of the edges that connect the context nodes to the two candidate nodes. Other similarity metrics can also be provided by the component 430.

The relevance determining component 440 determines a relevance metric that indicates how similar a node in the graph is to the received seed terms and corresponding nodes. The relevance determining component 440 invokes the similarity determining component 430 to determine similarity between any identified node and the seed terms. The relevance metrics indicates nearness of two concepts together, and how frequently they occur together in observable data, such as web lists or web query logs.

The coherence determining component 450 determines a coherence metric that indicates how consistent a concept set is that includes the seed nodes and one or more candidate nodes. Whereas relevance considers similarity between a node to the seeds, coherence considers similarity of nodes to other candidate nodes (and potentially the seeds also). Thus, the coherence measurement helps to identify nodes that are relevant but nonetheless likely do not belong in the same expanded set because they are incoherent compared to other candidate nodes. The coherence determining component 450 invokes the similarity determining component 430 to determine similarity between any identified node and a set of nodes. Determining coherence in addition to relevance helps to reduce noise and allows the system 400 to operate with potentially noisier datasets than prior systems.

The quality measurement component 460 combines the determined relevance metric and coherence metric to determine a quality metric that indicates relevance and coherence among a set of nodes in the graph. The quality metric may apply a weighting factor to the relevance and coherence so that each metric does not contribute equally to the resulting quality metric. Any particular implementation can set the weighting as desired and in some cases, an implementation may allow the weighting to be configured or provided as input to an API that invokes the system 400.

The iterative expansion component 470 identifies an expanded seed set having a high quality metric. In some embodiments, the component 470 performs an iterative process to get a better and better expanded seed set until a threshold number of iterations or until the quality of the expanded seed set has been maximized. The component 470 may also apply a thresholding function to determine a size of the expanded seed set that has a sufficiently high relevance metric and coherence metric. The threshold may be set statically based on an initial set of candidate nodes or may be determined dynamically and updated with each iteration.

The set reporting component 480 reports the identified expanded seed set as output. The output of the system 400 may provide the input to a complementary process that performs other work, such as using the expanded seed set to recommend products to users, to suggest friends in a social network, to verify item categorization, and so forth. The reporting may occur programmatically, to a user interface, to a file, or in any other form deemed useful for a particular implementation of the system 400. In some cases, the system 400 may run periodically to update set results and report any change in the expanded seed set. For example, over time, new products may be released or other items related to the purpose of the set, for which the set should be updated.

The computing device on which the set expansion system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
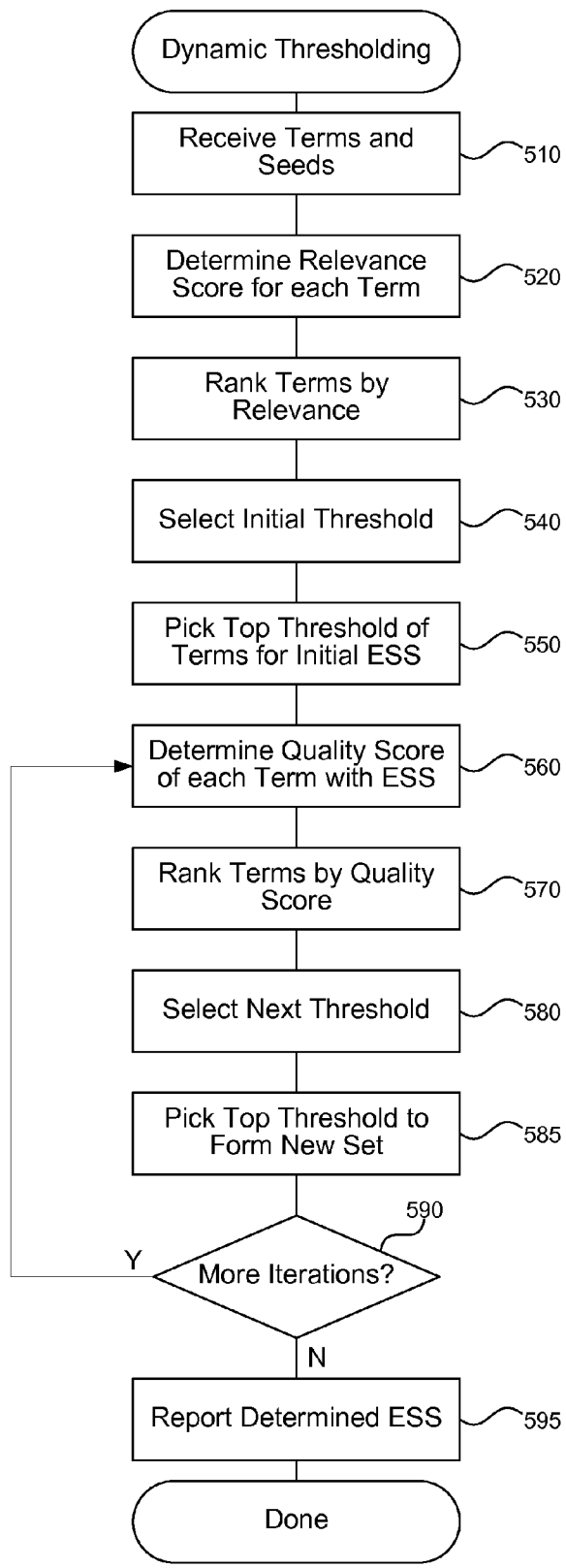
FIG. 5 is a flow diagram that illustrates processing of the set expansion system to expand a set of seeds with a dynamic threshold, in one embodiment.

FIG. 5 is a flow diagram that illustrates processing of the set expansion system to expand a set of seeds with a dynamic threshold, in one embodiment.

Beginning in block 510, the system receives a set of terms and identified seeds. The seeds may be provided in a separate set or as an identified subset of the received terms. The system may receive the terms and seeds through a user interface, programmatically through an API, web service or other interface exposed by the system to provide set expansion functionality to other systems and components. The set of terms may come from a list retrieved from the Internet, web query logs, or any other data source. In some cases, the data source may be noisy so that there are many terms unrelated to the seeds that are included in the set of terms. The process identifies those terms that are most related to expand the set of seeds.

Continuing in block 520, the system determines a relevance score for each term based on the identified seeds. The relevance score is based on a similarity metric that is determined using one or more similarity determining processes. For example, the system may determine a Jaccard similarity or Cosine similarity between each term and the identified seeds. The relevance score indicates how closely related each term is to the identified seeds. Relevance may indicate that the terms occur together with the seeds frequently in a data source.

Continuing in block 530, the system ranks the received set of terms by the determined relevance score. Those terms at the top or beginning of the ranked set are more relevant than those terms at the bottom. The system ranks the set to determine a base set of items that satisfy a threshold of relevance and may represent a target expanded seed set. Ranking occurs using a sorting function that orders the terms by the determined relevance scores.

Continuing in block 540, the system selects an initial threshold ranking value for separating terms in the set related to the seeds from terms not related to the seeds. Those terms with relevance scores above the threshold are considered to be related to the seeds and those terms below are considered not to be related to the seeds. The system may determine the threshold using iterative threshold selection, Otsu's thresholding, or other thresholding functions. The thresholding function determines a value within data that tends to mark a boundary between nodes in the data centered on one value and nodes centered on another value. The thresholding function is good for separating two sets of data mixed together by identifying the boundary.

Continuing in block 550, the system picks a top ranked number of terms above a threshold from the ranked set of terms based on the selected initial threshold to form a new set. The system selects terms with a relevance score that is above or equal to the selected initial threshold and uses matching terms to form the initial expanded seed set that will be refined in each iteration of an iterative process to determine terms most related to the seeds.

Continuing in block 560, the system determines a quality measurement that identifies how well each term relates to the picked threshold number of terms in the new set. The quality measurement may include a relevance score and a coherence score. In some embodiments, the system determines the quality measurement by combining a weighted relevance score with a weighted coherence score. The relevance score for a term is determined by calculating a similarity metric between the term and the identified seeds. The coherence score for a term is determined by calculating a similarity metric between the term and other terms in the received set of terms. Relevance tends to identify relatedness while coherence tends to eliminate outlying but related terms. By combining relevance and coherence, the system identifies related terms in noisy datasets, such as web lists and query logs.

Continuing in block 570, the system ranks the terms in the new set based on the determined quality measurement. The ranking places the most related terms to the seeds at the beginning of the new set. Because the process is iterative, the results improve with each iteration and more and more related items will bubble to the top until the process is complete.

Continuing in block 580, the system selects a next threshold to use to separate terms in the new set related to the seeds from terms not related to the seeds. The next threshold may differ from the initial threshold based on a distribution of the data in the new set. The process illustrated with reference to FIG. 5 differs from that of FIG. 6 based on the threshold being updated in each iteration.

Continuing in block 585, the system uses the selected next threshold to select a threshold number of terms from the ranked new set. The system uses the threshold to eliminate items in a potentially large set that fall outside a determined boundary of relatedness. With each iteration the process shifts new items across the boundary (and the boundary potentially moves based on the items) until the items at the top are those that are most related to the seeds.

Continuing in decision block 590, if the system has not exceeded a set number of iterations, then the system loops to block 560 to consider the new set, else the system continues to block 595. With a moving threshold and boundary, the process may not conclude without limiting the number of iterations. Thus, the system automatically sets or receives a number of iterations to perform to identify the most related terms to the seeds.

Continuing in block 595, the system reports the resulting expanded seed set that includes the terms in the received set that are the highest quality matches to the received seeds. The reporting may occur through a user interface, programmatic API, web service, or other interface for reporting results. The results may be received by an interactive user or may form the input to a subsequent process that uses the expanded seed set to perform additional work. After block 595, these steps conclude.

Figure 6:
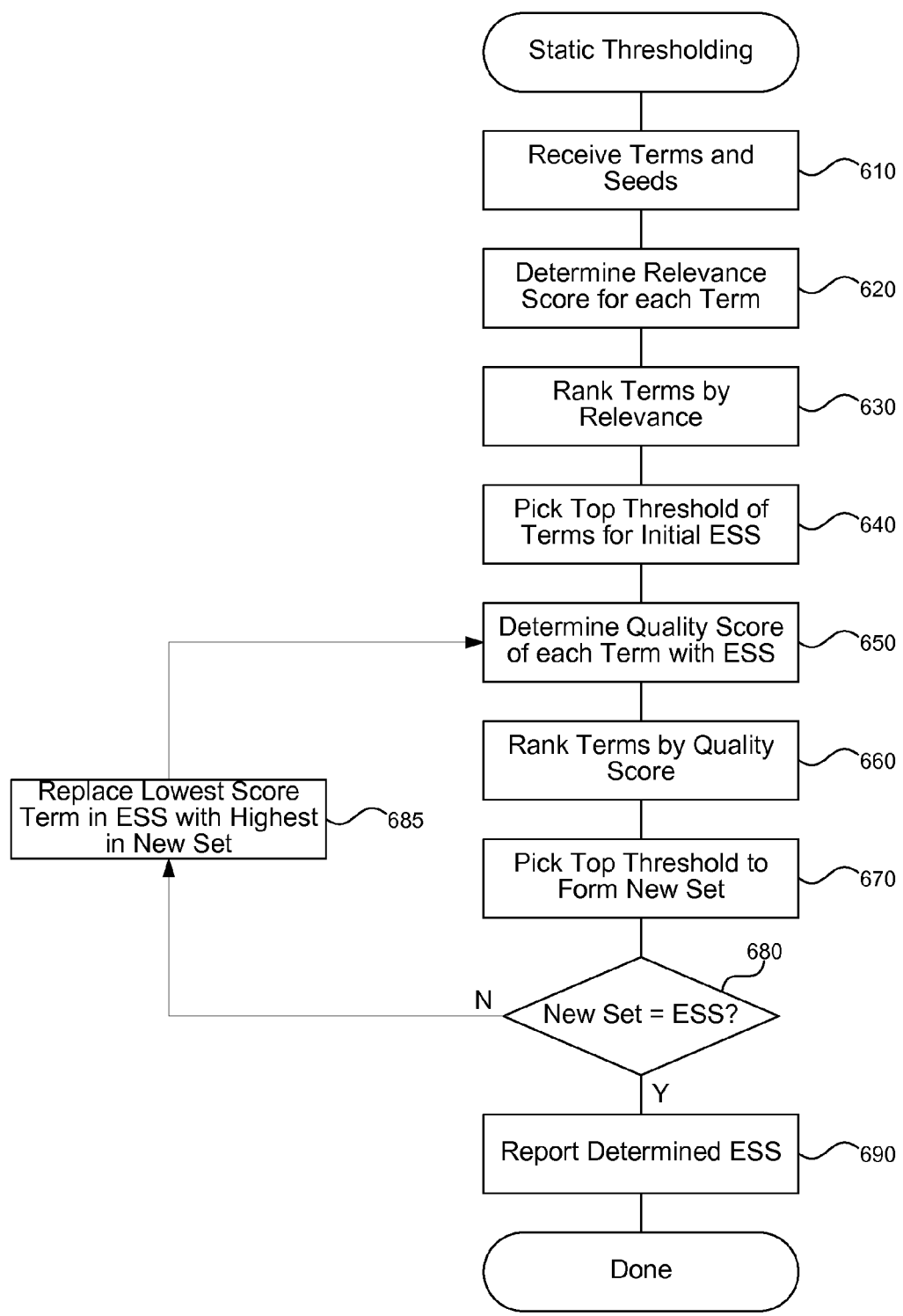
FIG. 6 is a flow diagram that illustrates processing of the set expansion system to expand a set of seeds with a static threshold, in one embodiment.

FIG. 6 is a flow diagram that illustrates processing of the set expansion system to expand a set of seeds with a static threshold, in one embodiment.

Beginning in block 610, the system receives a set of terms and identified seeds. The seeds may be provided in a separate set or as an identified subset of the received terms. The system may receive the terms and seeds through a user interface, programmatically through an API, web service or other interface exposed by the system to provide set expansion functionality to other systems and components. The set of terms may come from a list retrieved from the Internet, web query logs, or any other data source. In some cases, the data source may be noisy so that there are many terms unrelated to the seeds that are included in the set of terms. The process identifies those terms that are most related to expand the set of seeds.

Continuing in block 620, the system determines a relevance score for each term based on the identified seeds. The relevance score is based on a similarity metric that is determined using one or more similarity determining processes. For example, the system may determine a Jaccard similarity or Cosine similarity between each term and the identified seeds. The relevance score indicates how closely related each term is to the identified seeds. Relevance may indicate that the terms occur together with the seeds frequently in a data source.

Continuing in block 630, the system ranks the received set of terms by the determined relevance score. Those terms at the top or beginning of the ranked set are more relevant than those terms at the bottom. The system ranks the set to determine a base set of items that satisfy a threshold of relevance and may represent a target expanded seed set. Ranking occurs using a sorting function that orders the terms by the determined relevance scores.

Continuing in block 640, the system determines a threshold and picks a top ranked number of terms above a threshold from the ranked set of terms to form a new set. The system may determine the threshold using iterative threshold selection, Otsu's thresholding, or other thresholding functions. The thresholding function determines a value within data that tends to mark a boundary between nodes in the data centered on one value and nodes centered on another value. The thresholding function is good for separating two sets of data mixed together by identifying the boundary.

Continuing in block 650, the system determines a quality measurement that identifies how well each term relates to the picked threshold number of terms in the new set. The quality measurement may include a relevance score and a coherence score. In some embodiments, the system determines the quality measurement by combining a weighted relevance score with a weighted coherence score. The relevance score for a term is determined by calculating a similarity metric between the term and the identified seeds. The coherence score for a term is determined by calculating a similarity metric between the term and other terms in the received set of terms. Relevance tends to identify relatedness while coherence tends to eliminate outlying but related terms. By combining relevance and coherence, the system identifies related terms in noisy datasets, such as web lists and query logs.

Continuing in block 660, the system ranks the terms in the new set based on the determined quality measurement. The ranking places the most related terms to the seeds at the beginning of the new set. Because the process is iterative, the results improve with each iteration and more and more related items will bubble to the top until the process is complete.

Continuing in block 670, the system uses the previously determined threshold to select a threshold number of terms from the ranked new set. The system uses the threshold to eliminate items in a potentially large set that fall outside a determined boundary of relatedness. With each iteration, the process shifts new items across the boundary until the items at the top are those that are most related to the seeds.

Continuing in decision block 680, if the system determines that the selected threshold number of terms from the ranked new set matches the top ranked number of terms from the previously ranked set of terms, then the system continues at block 690, else the system continues at block 685. If the sets match, then the system is done because no more related set can be identified through further iterations.

Continuing in block 685, the system replaces the lowest ranked term in the previously ranked set with the highest ranked term in the new set that is not already in the previously ranked set. Because the sets did not match, there is at least one term in the new set that is not in the previous set, and potentially more. The system selects the highest quality of these terms and places that term into the running expanded seed set. After block 685, the system loops to block 650 to determine a score for the new set and begin the next iteration. The system repeats steps 650 to 685 until no better expanded seed set can be found or until a bound of iterations is reached.

Continuing in block 690, the system reports the resulting expanded seed set that includes the terms in the received set that are the highest quality matches to the received seeds. The reporting may occur through a user interface, programmatic API, web service, or other interface for reporting results. The results may be received by an interactive user or may form the input to a subsequent process that uses the expanded seed set to perform additional work. After block 690, these steps conclude.

From the foregoing, it will be appreciated that specific embodiments of the set expansion system have been described herein for purposes of illustration, but that various modifications may be made without deviating from the spirit and scope of the invention. Accordingly, the invention is not limited except as by the appended claims.

We claim:

1. A computer system for iterative set expansion using samples, the system comprising:
 a processor and memory configured to execute software instructions embodied within the following components;

an input component that receives a set of seed terms and a set of terms and associated contexts with which to expand the set of seed terms;

a data modeling component that models the received terms and seeds as a bipartite graph with candidate terms being nodes on one side and identified context nodes on the other side, and models web query log data by dividing each query into a context of a fixed number of tokens of prefix or suffix and a remaining term;

a similarity determining component that determines a similarity metric between two candidate nodes in the graph based on the candidate nodes' relationship to the context nodes in the graph;

a relevance determining component that determines a relevance metric that indicates how similar a node in the graph is to the received seed terms and corresponding nodes;

a coherence determining component that determines a coherence metric that indicates how consistent a concept set is that includes the seed terms and one or more candidate nodes;

a quality measurement component that combines the determined relevance metric and coherence metric to determine a quality metric that indicates relevance and coherence among a set of nodes in the graph;

an iterative expansion component that identifies an expanded seed set having a high quality metric; and a set reporting component that reports the identified expanded seed set as output.

2. The system of claim 1 wherein the data modeling component assigns weights to the edges between nodes based on a quality of a source from which the terms were extracted.

3. The system of claim 1 wherein the data modeling component models web query log data by weighting the edges using a mutual information probability calculation and discarding edges below a threshold probability.

4. The system of claim 1 wherein the coherence determining component considers similarity of nodes to other candidate nodes to identify nodes that are relevant but are identified as not likely to belong in the same expanded set because they are incoherent compared to other candidate nodes.

5. The system of claim 1 wherein the quality measurement component determines coherence in addition to relevance to reduce noise and allows the system to operate with readily available but noisy datasets.

6. A computer-implemented method to expand a set of seeds while applying a dynamic threshold of relatedness, the method comprising:

receiving from a web query log a set of terms with contexts and one or more identified seeds, wherein the seeds are terms that are related to a concept for which to identify additional related terms from the set of terms;

modeling the received terms and seeds as a bipartite graph with candidate terms being nodes on one side and identified context nodes on the other side by dividing each query into a context of a fixed number of tokens of prefix or suffix and a remaining term;

determining a relevance score for each term based on the identified seeds;

ranking the received set of terms by the determined relevance score;

selecting an initial threshold ranking value for separating terms in the set related to the seeds from terms not related to the seeds;

picking a top ranked number of terms above a threshold from the ranked set of terms based on the selected initial threshold to form a new set;

determining a quality measurement that identifies how well each term relates to the picked threshold number of terms in the new set;

ranking the terms in the new set based on the determined quality measurement;

selecting a next threshold to use to separate terms in the new set related to the seeds from terms not related to the seeds;

using the selected next threshold to select a threshold number of terms from the ranked new set;

repeating the steps of determining the quality measurement, ranking the terms, and selecting a threshold number of terms for a determined number of iterations; and reporting the resulting expanded seed set that includes the terms in the received set that are the highest quality matches to the received seeds, wherein the preceding steps are performed by at least one processor.

7. The method of claim 6 wherein receiving the terms and seeds comprises receiving the terms and seeds programmatically through an application-programming interface (API) that exposes the method to software components to provide set expansion functionality.

8. The method of claim 6 wherein receiving the terms and seeds comprises receiving the set of terms from a list retrieved from the Internet.

9. The method of claim 6 wherein receiving the terms and seeds comprises receiving a noisy set of terms that includes many unrelated terms in the set, and wherein the method identifies those terms that are most related to expand the set of seeds while eliminating the noise.

10. The method of claim 6 wherein determining the relevance score comprises calculating a similarity metric that is determined using a jaccard similarity or Cosine similarity function between each term and the identified seeds.

11. The method of claim 6 wherein ranking the received terms comprises invoking a sorting function that orders the terms by the determined relevance scores.

12. The method of claim 6 wherein selecting the initial threshold comprises identifying those terms with relevance scores above the threshold as related to the seeds and those terms below as not to be related to the seeds.

13. The method of claim 6 wherein selecting the initial threshold comprises using iterative threshold selection or Otsu's thresholding to select the threshold.

14. The method of claim 6 wherein picking the top ranked number of terms comprises selecting terms with a relevance score that is above or equal to the selected initial threshold and using matching terms to form an initial expanded seed set that will be refined in each iteration of an iterative process to determine terms most related to the seeds.

15. The method of claim 6 wherein determining the quality measurement comprises calculating a relevance score and a coherence score, wherein the quality measurement is combination of a weighted relevance score and a weighted coherence score.

16. The method of claim 6 wherein selecting the next threshold comprises selecting a value that differs from the initial threshold based on a distribution of the data in the new set.

17. The method of claim 6 further comprising repeating the steps of determining a quality measurement, ranking the terms, selecting the next threshold, and using the selected next threshold to select a threshold number of items for a fixed number of iterations to iteratively improve a resulting expanded seed set.

18. A computer-readable storage medium comprising instructions for controlling a computer system to expand a set of seeds using a static threshold, wherein the instructions, upon execution, cause a processor to perform actions comprising:

receiving a set of terms with contexts modeled as a general bipartite graph and identified seeds, wherein the seeds are terms that are related to a concept for which to identify additional related terms from the set of terms, and wherein the set of terms are modeled from web query log data by weighting the edges using a mutual information probability calculation and discarding edges below a threshold probability;

determining a relevance score for each term based on the identified seeds;

ranking the received set of terms by the determined relevance score;

determining a static threshold and picking a top ranked number of terms above a threshold from the ranked set of terms to form a new set;

determining a quality measurement that identifies how well each term relates to the picked threshold number of terms in the new set;

ranking the terms in the new set based on the determined quality measurement;

using the previously determined static threshold to select a threshold number of terms from the ranked new set;

upon determining that the selected threshold number of terms from the ranked new set does not match the top ranked number of terms from the previously ranked set of terms, replacing the lowest ranked term in the previously ranked set with the highest ranked term in the new set that is not already in the previously ranked set; and repeating the steps of determining the quality measurement, ranking the terms, selecting a threshold number of terms, and replacing the lowest ranked term until the sets match; and upon determining that the selected threshold number of terms from the ranked new set matches the top ranked number of terms from the previously ranked set of terms, reporting the resulting expanded seed set that includes the terms in the received set that are the highest quality matches to the received seeds.

* * * * *